(12) United States Patent
Bowman et al.

(10) Patent No.: US 9,639,418 B2
(45) Date of Patent: May 2, 2017

(54) PARITY PROTECTION OF A REGISTER

(71) Applicant: International Business Machines Corporation, Armonk, NY (US)

(72) Inventors: Joshua W. Bowman, Austin, TX (US); Sam G. Chu, Round Rock, TX (US); Dhivya Jeganathan, Austin, TX (US); Cliff Kucharski, Austin, TX (US); Dung Q. Nguyen, Austin, TX (US); David R. Terry, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 14/842,619

(22) Filed: Sep. 1, 2015

(65) Prior Publication Data

US 2017/0060673 A1 Mar. 2, 2017

(51) Int. Cl.
G06F 11/10 (2006.01)
G06F 3/06 (2006.01)

(52) U.S. Cl.
CPC .......... *G06F 11/1004* (2013.01); *G06F 3/064* (2013.01); *G06F 3/0619* (2013.01); *G06F 3/0673* (2013.01); *G06F 11/1076* (2013.01)

(58) Field of Classification Search
CPC ......................... G06F 11/1004; G06F 11/1076
See application file for complete search history.

(56) References Cited

U.S. PATENT DOCUMENTS

| 3,573,728 | A | * | 4/1971 | Kolankowsky | G06F 11/1056 714/764 |
|---|---|---|---|---|---|
| 3,585,378 | A | * | 6/1971 | Bouricius | G06F 11/1016 365/201 |
| 3,659,089 | A | * | 4/1972 | Payne | G06F 11/104 708/531 |
| 4,531,213 | A | * | 7/1985 | Scheuneman | G06F 11/1032 714/703 |
| 4,817,095 | A | * | 3/1989 | Smelser | G06F 11/1056 362/201 |

(Continued)

OTHER PUBLICATIONS

IBM et al., Parity Prediction Circuitry for Cyclic Code Checking: An IP.com Prior Art Database Technical Disclosure, pp. 1-2, Feb. 24, 2005, Fairport, United States.

(Continued)

*Primary Examiner* — Joseph D Torres
(74) *Attorney, Agent, or Firm* — Patterson + Sheridan, LLP

(57) ABSTRACT

The embodiments herein generate parity check data which serves as parity-on-parity. Stated differently, the parity check data can be used to determine if parity data stored in a memory element has been corrupted. For example, after generating the parity data, a computing system may set the parity check data depending on whether there is an even or odd number of logical ones (or logical zeros) in the parity data. Thus, when the parity data is read out of the memory element, if the parity data does not include the same number of even or odd bits, the parity check data indicates to the computing system that the parity data is corrupted. In one embodiment, to reduce the likelihood that the parity check data becomes corrupted, the computing system stores this data in hardened latches which are less susceptible to soft errors than other types of memory elements.

20 Claims, 6 Drawing Sheets

(56) References Cited

U.S. PATENT DOCUMENTS

| | | | | |
|---|---|---|---|---|
| 4,918,695 A * | 4/1990 | Scheuneman | ....... | G06F 11/1056 714/763 |
| 5,164,944 A * | 11/1992 | Benton | ............... | G06F 11/1016 714/702 |
| 6,687,797 B1 * | 2/2004 | Walton | .................. | G06F 3/0617 710/240 |
| 6,820,047 B1 * | 11/2004 | Aizawa | ............ | G01R 31/31834 703/14 |
| 7,523,379 B1 | 4/2009 | Gschwind | | |
| 2003/0093744 A1 * | 5/2003 | Leung | ................ | G06F 11/1048 714/763 |
| 2007/0033514 A1 * | 2/2007 | Ogawa | ................ | G06F 11/1032 714/801 |
| 2010/0162068 A1 * | 6/2010 | Toda | .................. | G06F 11/1048 714/747 |
| 2010/0223531 A1 * | 9/2010 | Fukutomi | ........... | G06F 11/1052 714/764 |
| 2011/0047439 A1 | 2/2011 | Jorda et al. | | |
| 2013/0073921 A1 * | 3/2013 | Kamoshida | ............ | H03M 13/11 714/758 |
| 2013/0246750 A1 | 9/2013 | Moyer et al. | | |
| 2014/0063996 A1 * | 3/2014 | Takahashi | ........... | G06F 11/1048 365/200 |
| 2014/0115424 A1 * | 4/2014 | Yoo | ........................ | G06F 12/00 714/763 |
| 2016/0170828 A1 * | 6/2016 | Carlough | ............ | G06F 11/1004 714/49 |
| 2016/0188408 A1 * | 6/2016 | Anderson | ............ | G06F 3/0619 714/764 |

OTHER PUBLICATIONS

Internet Society Requests for Comment et al., RTP Payload Format for 1-D Interleaved Parity Forward Error Correction (FEC) (RFC6015): An IP.com Prior Art Database Technical Disclosure, Oct. 15, 2010, pp. 1-31, Fairport, United States.

IBM et al., Method for Testing Error Correction Code and Parity Flow Through Buffer: An IP.com Prior Art Database Technical Disclosure, Apr. 1, 2005, pp. 193-196, Fairport, United States.

* cited by examiner

PARITY PROTECTION OF A REGISTER

BACKGROUND

The present invention relates to storing parity data in registers, and more specifically, to determining whether stored parity data has become corrupted.

A processor may generate parity data when writing user data into a register. The parity data may be used to determine whether the user data stored in the register has become corrupted because of, for example, a soft error. When storing the user data, the processor evaluates the user data to generate the parity data which may be stored in the register along with the user data. When the user data is retrieved, the processor evaluates the parity data to ensure the user data has not become corrupted.

SUMMARY

According to one embodiment of the present invention, an integrated circuit includes a memory including a plurality of registers, each register includes a data entry and a parity entry. The integrated circuit also includes a plurality of latches distinct from the plurality of registers and logic. The logic is configured to, in response to receiving a write request to a first register of the plurality of registers, generate parity data based on data corresponding to the write request. The logic is also configured to store the data corresponding to the write request and the parity data in the first register and generate parity check data based on the parity data, where the parity check data, when compared with the parity data, indicates whether a soft error is introduced in the parity data when stored in the first register. The logic is configured to store the parity check data in a first latch of the plurality of latches.

According to another embodiment of the present invention, a method includes generating parity data based on data corresponding to the write request in response to receiving a write request to a first register of a plurality of registers and storing the data corresponding to the write request and the parity data in the first register. The method includes generating parity check data based on the parity data, where the parity check data, when compared with the parity data, indicates whether a soft error is introduced in the parity data when stored in the first register, and storing the parity check data in a first latch of a plurality of latches, where the plurality of latches are distinct from the plurality of registers.

According to another embodiment of the present invention, a processor that includes a memory including a plurality of registers, each register includes a data entry and a parity entry. The processor also includes a plurality of memory elements distinct from the plurality of registers, where the plurality of memory elements are less susceptible to soft errors than the plurality of registers. The processor includes logic configured to, in response to receiving a write request to a first register of the plurality of registers, generate parity data based on data corresponding to the write request and store the data corresponding to the write request and the parity data in the first register. The logic includes generating parity check data based on the parity data, where the parity check data, when compared with the parity data, indicates whether a soft error is introduced in the parity data when stored in the first register and storing the parity check data in a first memory element of the plurality of memory elements.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein include a computing system that generates parity data when writing user data into a memory element—e.g., a register on a processor. In one embodiment, the computing system processes the user data to generate parity data (e.g., an error correction code (ECC), cyclic redundancy check (CRC), and the like) which is stored in the memory element along with the user data. When retrieving the user data from the memory element, the computing system uses the parity data to ensure the user data has not become corrupted by, for example, a soft error. However, the parity data is also susceptible to soft errors which may cause the computing system to determine that the user data has been corrupted even though it may be the parity data which is corrupted.

In the embodiments herein, the computing system generates parity check data which serves as parity-on-parity. Stated differently, the parity check data can be used to determine if the parity data has been corrupted. For example, after generating the parity data, the computing system may set the parity check data depending on whether there is an even or odd number of logical ones (or logical zeros) in the parity data. Thus, when the parity data is read out of the memory element, if the parity data does not include the same number of even or odd bits, the parity check data indicates to the computing system that the parity data is corrupted. In one embodiment, to reduce the likelihood that the parity check data becomes corrupted, the computing system stores this data in hardened latches which are less susceptible to soft errors than other types of memory elements such as RAM.

Figure 1:
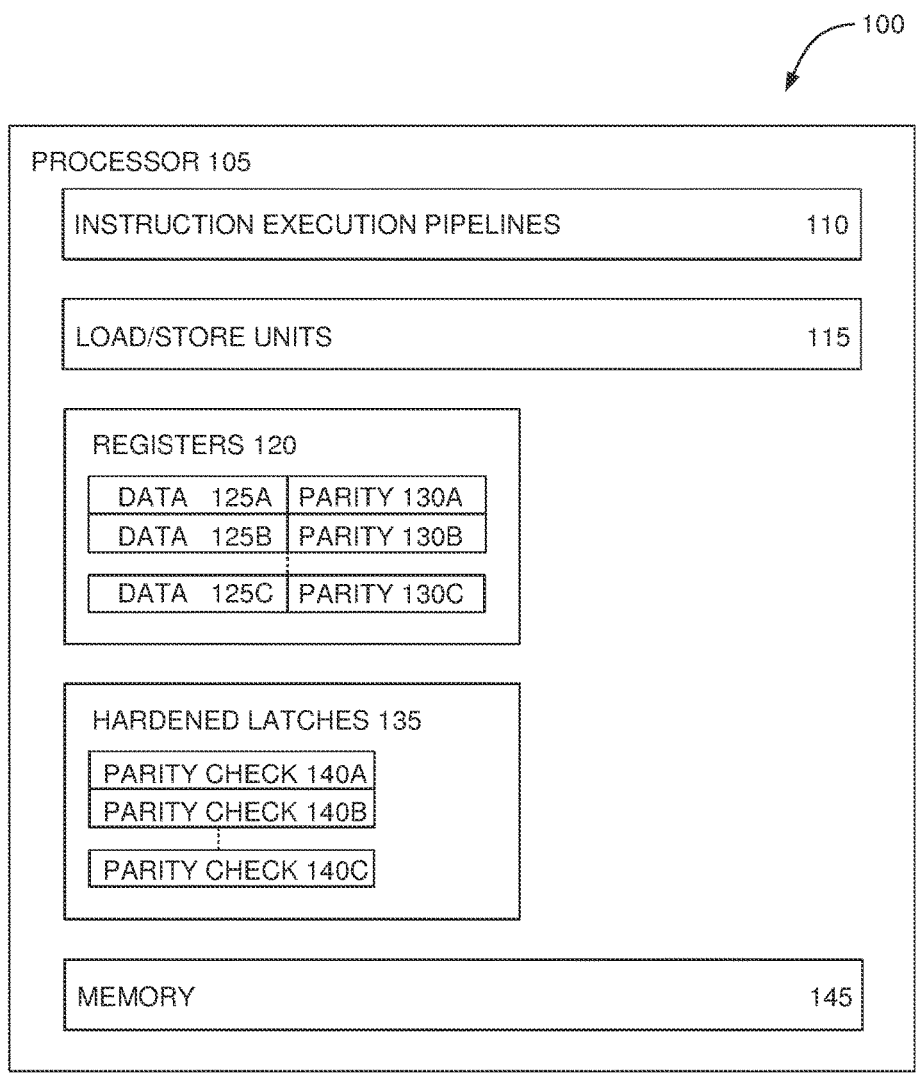
FIG. 1 illustrates a processor that generates parity check data corresponding to register writes, according to one embodiment described herein.

FIG. 1 illustrates a computing system 100 that generates parity check data corresponding to register writes, according to one embodiment described herein. The system 100 includes a processor 105 which represents one or more processing elements that each may include one or more processing cores. The processor 105 includes instruction execution pipelines 110, load/store units 115, registers 120, hardened latches 135, and memory 145. The pipelines 110 represent multiple sequential steps for executing multiple computer instructions in parallel—e.g., a register load, add, copy, etc. To execute the computer instruction, the pipelines 110 may send requests to store data in, or read data from, the registers 120 (e.g., SRAM). The load/store units 115 may serve as an intermediary between the registers 120 and the memory 145. For example, in response to a request from an instruction execution pipeline 110 to write data into a register 120, the load/store unit 115 retrieves the data from the memory 145 and stores the data in the register 120. Conversely, the load/store units 115 may also store data retrieved from the registers 120 into the memory 145. For example, after the instruction execution pipeline 110 processes the data in the register 120, the load/store unit 115 stores the updated data in the memory 145.

The memory 145 may include volatile memory, non-volatile memory, or combinations thereof. In one embodiment, the memory 145 is a data cache or RAM for the processor 105. Moreover, although shown as being internal to the processor 105, portions of the memory 145 may be located outside the processor 105—e.g., located external to the integrated circuit or circuits that include the processor 105.

As shown, each register 120 includes multiple fields or entries. In this example, the registers 120 each includes a data entry 125 and a parity entry 130. Each of these entries 125, 130 may have a predetermined length that defines the number of bit locations in the entries. In the examples below, it is assumed the data entry 125 stores 8 bytes (64 bits) of user data (e.g., data retrieved from the memory 145) while the parity entry 130 stores 8 bits of data. However, this is just one example and is not intended to limit the scope of the embodiments herein. For example, other suitable lengths include 4 bytes for the data entry 125 and 4 bits for the parity entry 130.

While storing the user data into a register 120, the processor 105 generates corresponding parity data which is stored in the parity entry 130. For example, the parity data may be an ECC or CRC. The parity data is not limited to any particular type of parity scheme, but instead, can be any type of error detecting code. In one embodiment, the processor 105 includes a parity generator that processes the user data retrieved from the memory 145 to calculate the parity data. Once generated, the parity data is stored in the parity entry 130. As discussed above, the parity data is used when the user data stored in the data entry 125 is read out of the register 120 to ensure this data has not become corrupted.

One way data can become corrupted is by soft errors which, stated generally, are any type of error where data stored in a memory element becomes corrupted. In one embodiment, a soft error is not a result of a design mistake or because the physical hardware (e.g., a register 120) is broken. That is, the occurrence of a soft error does not necessarily imply that the system is less reliable than before the soft error occurred. Various causes of soft errors include alpha particles from package decay where radioactive contaminants emit alpha particles that flip a bit stored in memory, cosmic rays creating energetic neutrons and protons, random noise, and the like. The parity data helps the processor 105 detect, and possibly correct, soft errors in the data entry 125.

However, because the parity data is stored using the same type of memory as the user data, the parity data stored in the parity entries 130 is also susceptible to soft errors where one or more bits in the parity data may flip. To help identify soft errors in the parity data stored in the registers 120, the processor 105 stores parity check data 140 in the hardened latches 135. In one embodiment, the latches 135 are less susceptible to soft errors than the registers 120. For example, the registers 120, which may be implemented using RAM, are more likely to have a flipped bit when subjected to alpha particles or cosmic rays than the latches 135. By storing the parity check data 140 in latches, it is less likely this data will be corrupted. However, the latches 135 may be more expensive to fabricate on the processor 105 than the registers 120. Nonetheless, the processor 105 may need only a small number of latches in order to store parity check data 140 for each of the registers 120. For example, the parity check data 140 may include a single bit, in which case, the processor 105 may need only one latch 135 per register 120. In contrast, if the parity data in the parity entries 130 were stored in hardened latches rather than the registers 120, eight latches would be needed for each register 120 (again assuming the parity data includes 8 bits). Thus, by adding the hardened latches 135 for storing parity check data, the processor 105 is able to reduce the negative effects of soft errors on the parity data without having to store the parity data in the latches 135, thereby saving power and potentially saving space on the processor 105.

To generate the parity check data 140, in one embodiment, the processor 105 includes a parity check calculator which uses the parity data as an input. For example, the parity check calculator may determine whether the parity data includes an odd or even number of logical ones (or zeros) and store a corresponding bit in the hardened latch 135. When retrieving data from the registers 120, the processor 105 may again determine whether the parity data includes an odd or even number of logical ones (or zeros) and see if that matches the parity check data 140. If not, the processor 105 assumes the parity data was corrupted (e.g., experienced a soft error). In one embodiment, the processor 105 performs an error correction process which may be used to correct the parity data, although this is not a requirement.

Although the examples herein disclose the parity check data as being one bit stored in a hardened latch, the parity check data may include multiple bits and may be used to correct errors as well as detect errors in the parity data. Further, the parity check data may be generated using even/odd parity, error correction algorithms, cyclic redundancy algorithms, and the like.

Figure 2:
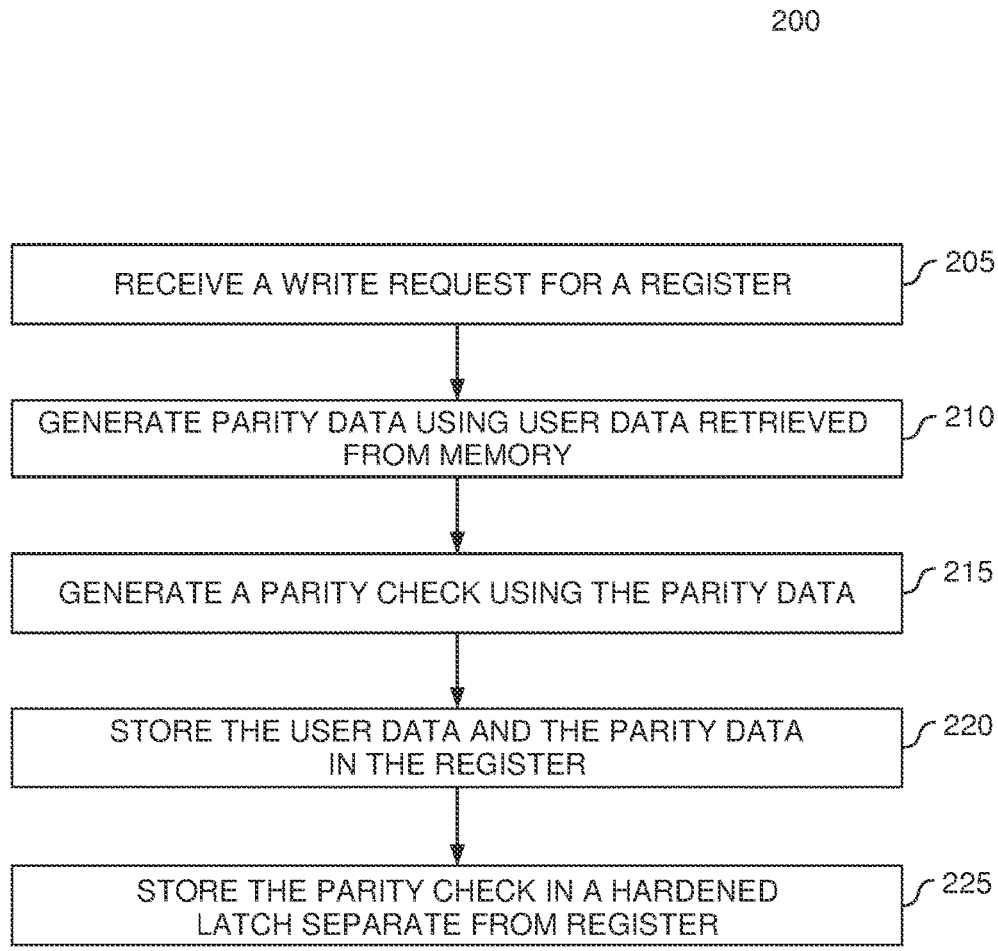
FIG. 2 is a flow chart for generating parity check data, according to one embodiment described herein.
Figure 3:
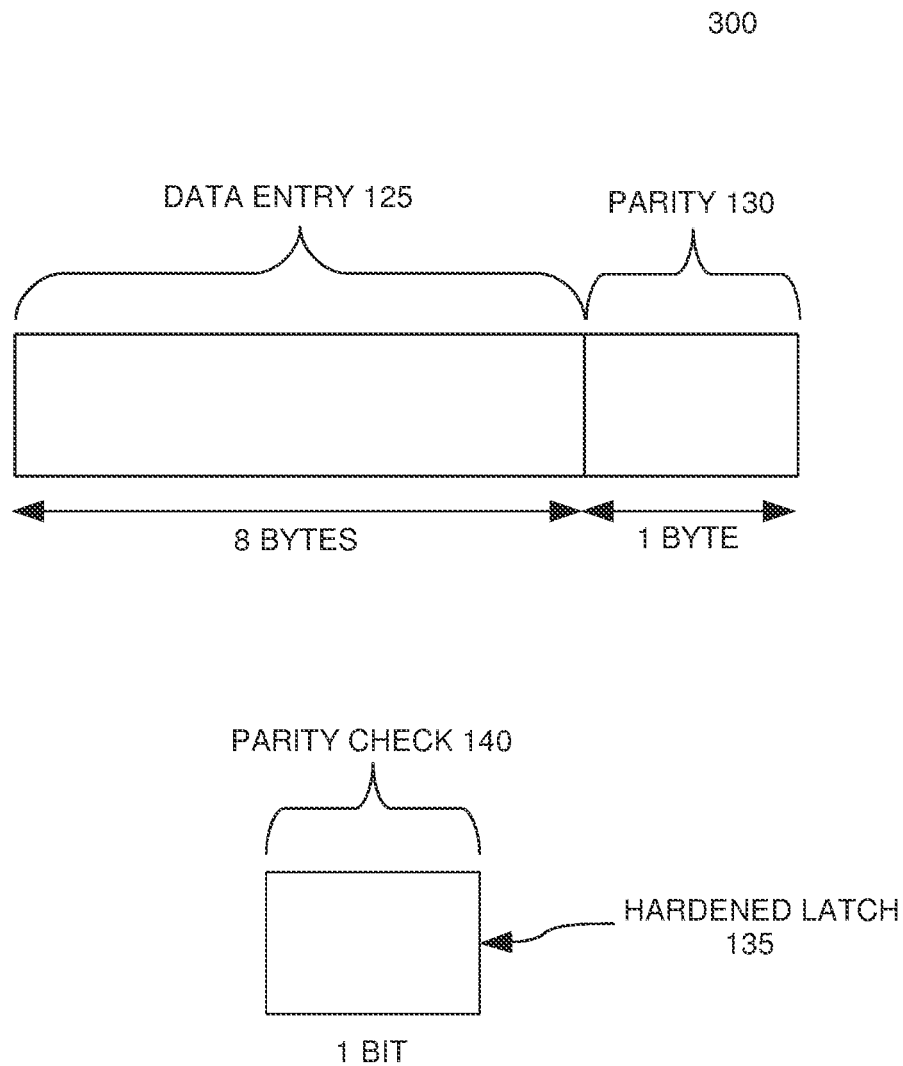
FIG. 3 illustrates storing user data, parity data, and parity check data, according to one embodiment described herein.

FIG. 2 is a flow chart illustrating a method 200 for generating parity check data, according to one embodiment described herein. For clarity, method 200 is discussed in parallel with register 300 and hardened latch 135 which are illustrated in FIG. 3. At block 205, a load/store unit receives a write request for a register. For example, the write request may be issued by an execution pipeline in the processor. In response, the load/store unit retrieves user data from memory (e.g., cache, RAM module, disk drive, etc.) and stores the retrieved data in the destination register. As shown in FIG. 3, the register 300 includes a data entry 125 which stores 8 bytes of user data.

At block 210, the processor generates parity data using the user data retrieved from memory. As mentioned above, the processor may use any technique to generate the parity data, such as even or odd parity. The parity data can be any data value used to identify an error in the user data stored in the register. Moreover, in one embodiment, the parity data may include data that enables the processor to correct, as well as identify, errors in the user data such as an ECC or CRC.

As shown in FIG. 3, the register 300 includes the parity entry 130 which stores the parity data. In this example, the parity data is 1 byte (8 bits) where each bit corresponds to one byte of data stored in the data entry 125. For example bit[0] in the parity entry 130 corresponds to byte[0] of the data entry 125, bit[1] corresponds to byte[1], and so forth. When reading at the user data, the parity bits in the parity entry 130 may be used to ensure the corresponding bytes of data stored in the data entry 125 have not become corrupted.

At block 215, the processor generates parity check data using the parity data. In FIG. 3, the parity check data 140 is a one bit value and is stored in the hardened latch 135. The parity check data 140 is used by the processor to determine whether there is an error in the parity data stored in the parity entry 130. For example, the processor may set the parity check data 140 as a logical one if there is an even number of logical ones in the parity data but a logical zero if there is an odd number of logical ones in the parity data. When reading the parity data out of the parity entry 130, the processor can again determine if the parity data includes an even or odd number of logical ones and compare this information to the parity check data 140 to determine if the parity data has been corrupted.

At block 220, the processor stores the data of the write request and the parity data in the register. At block 225, the processor stores the parity check data in the hardened latch 135 which is distinct from (i.e., not part of) the register 300. Blocks 220 and 225 of method 200 may be performed in parallel or during non-overlapping time periods.

Figure 4:
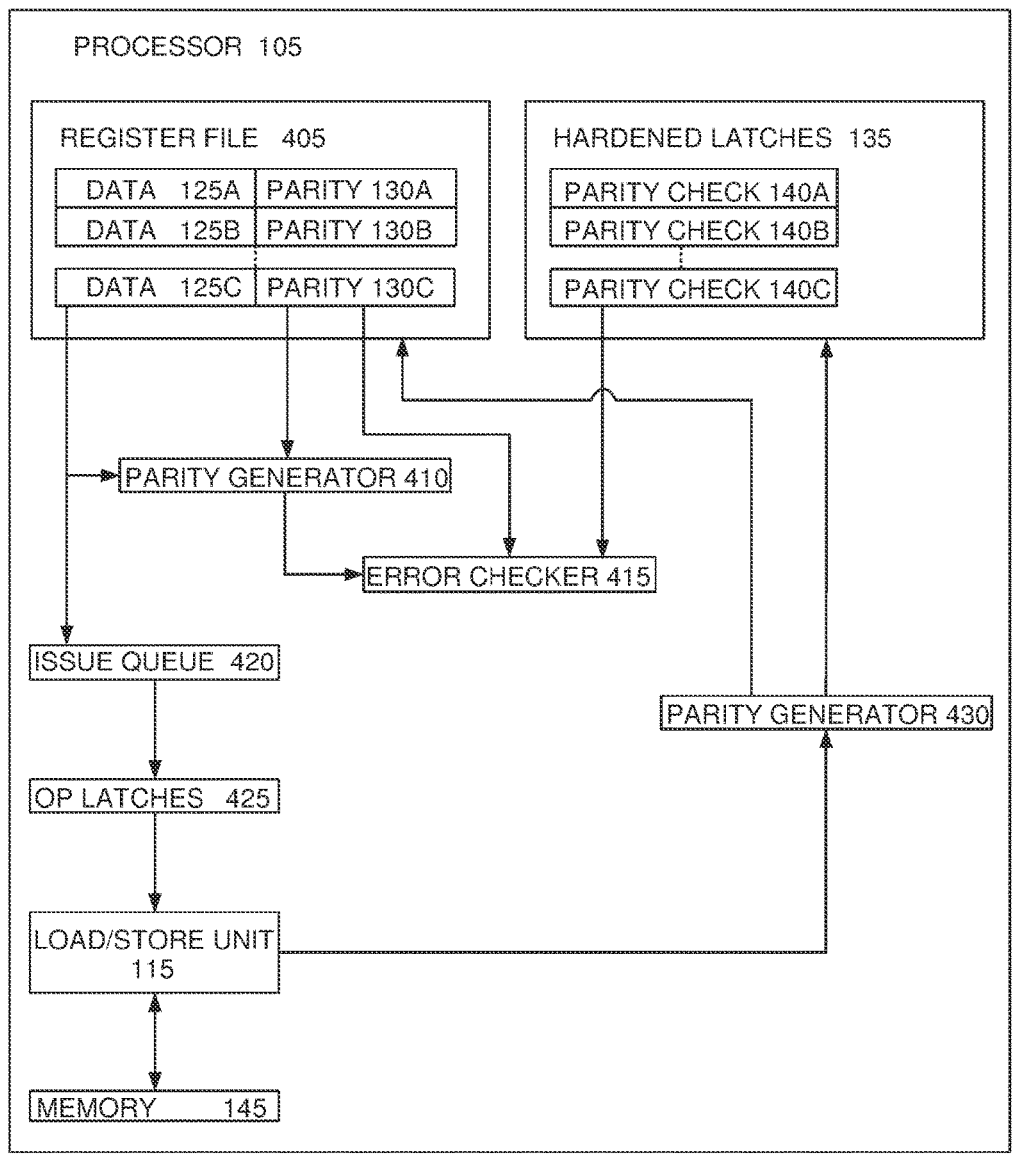
FIG. 4 illustrates a processor that generates parity check data corresponding to register writes, according to one embodiment described herein.

FIG. 4 illustrates a processor 105 that generates parity check data corresponding to register writes, according to one embodiment described herein. The processor 105 includes a register file 405 which contains multiple registers that each includes a respective data entry 125 and parity entry 130. The register file 405 may be a scalar register file for storing scalar data, a vector register file for storing data used in floating point operations, a history buffer that may save data previously stored in other registers so the state of the processor 105 can be saved or rolled back, and the like. The data entry 125 and parity entry 130 have a similar function as the entries discussed above which will not be repeated here.

The processor 105 includes a load/store unit 115 and parity generator which are used to store data in the register file 405. For example, a thread executing in a pipeline of the processor 105 (not shown) may send an instruction to the load/store unit 115 to load a particular value into the register file 405. To do so, the load/store unit 115 retrieves the user data from the memory 145 which may include a cache memory on the processor or memory elements external to the processor 105—e.g., RAM or a hard disk.

The parity generator 430 receives the user data from the load/store unit 115 which the parity generator 430 then uses to generate the parity data stored in the parity entry 130 of the destination register. Moreover, the parity generator 430 (or a separate generator) uses the parity data to generate the parity check data 140 which is stored in the hardened latches 135. That is, the parity generator 430 performs two parity calculations: one that uses the user data to generate the parity data and another that uses the parity data to generate the parity check data. The parity data can be used to identify soft errors in the user data stored in the data entry 125, while the parity check data can be used to identify soft errors in the parity data stored in the parity entry 130. In one embodiment, each register in the register file 405 storing valid data corresponds to a respective one of the hardened latches 135 which stores parity check data 140 for the parity data stored in the register. For example, the processor 105 may include that same number of hardened latches 135 as it does registers in the register file 405.

The processor 105 may request to read user data from one of the registers in the register file 405 which is then transmitted to an issue queue 420. When reading user data from a particular register in the register file 405, the processor 105 performs an error correction check to make sure the data has not been corrupted. For example, alpha particles or background radiation may cause one or more of the bits in the registers to flip. By performing the error check, the processor 105 can mitigate and possibly correct these errors in the user data.

The processor 105 includes a parity generator 410 and error checker 415 for performing an error detection operation when retrieving data from the register file 405. The parity generator 410 accepts both the user data stored in the data entry 125 and the parity data stored in the parity entry 130 as inputs. In one embodiment, like parity generator 430, the parity generator 410 performs two parity calculations: a first calculation using the user data, and a second calculation using the parity data. These two parity calculations are then provided to the error checker 415. The error checker 415 compares the result of the first parity calculation performed by the parity generator 410 to the parity data stored in the parity entry 130. Because the parity generators 410, 430 perform the same parity calculation on the user data, this data should match. However, if the data does not match, there may be an error in the user data, the parity data, or both. That is, based solely on comparing the result of the first parity calculation to the parity data, the error checker 415 can determine if there is an error in the register, but cannot determine if the soft error occurred in the user data or the parity data.

The error checker 415 also compares the result of the second parity calculation performed by the parity generator 410 to the parity check data 140 stored in the corresponding hardened latch 135. Because the parity generators 410, 430 perform the same parity calculation on the parity data, this data should match. If the data does not match, the processor 105 determines that the parity data has become corrupted. Because the parity check data 140 is stored in a hardened latch 135, it is unlikely to have been corrupted by a soft error. As such, if the data does not match, the processor 105 assumes it is the parity data that has been corrupted. Although not shown, the processor 105 may perform error correction to mitigate or correct the error (or errors) in the parity data which is not discussed in detail in this disclosure.

If the error checker 415 determines there are no errors in the user data and/or parity data, the checker 415 forwards the user data to an issue queue 420. Once the data is received, the issue queue 420 forwards the data to operand (OP) latches 425 that store the received data as operands for processor instructions. For example, the OP latches 425 may store the result of performing an add or multiply instruction using the user data retrieved from the register. The OP latches 425 forward the updated data to the load/store unit 115 which may transmit the data to the memory 145.

Figure 5:
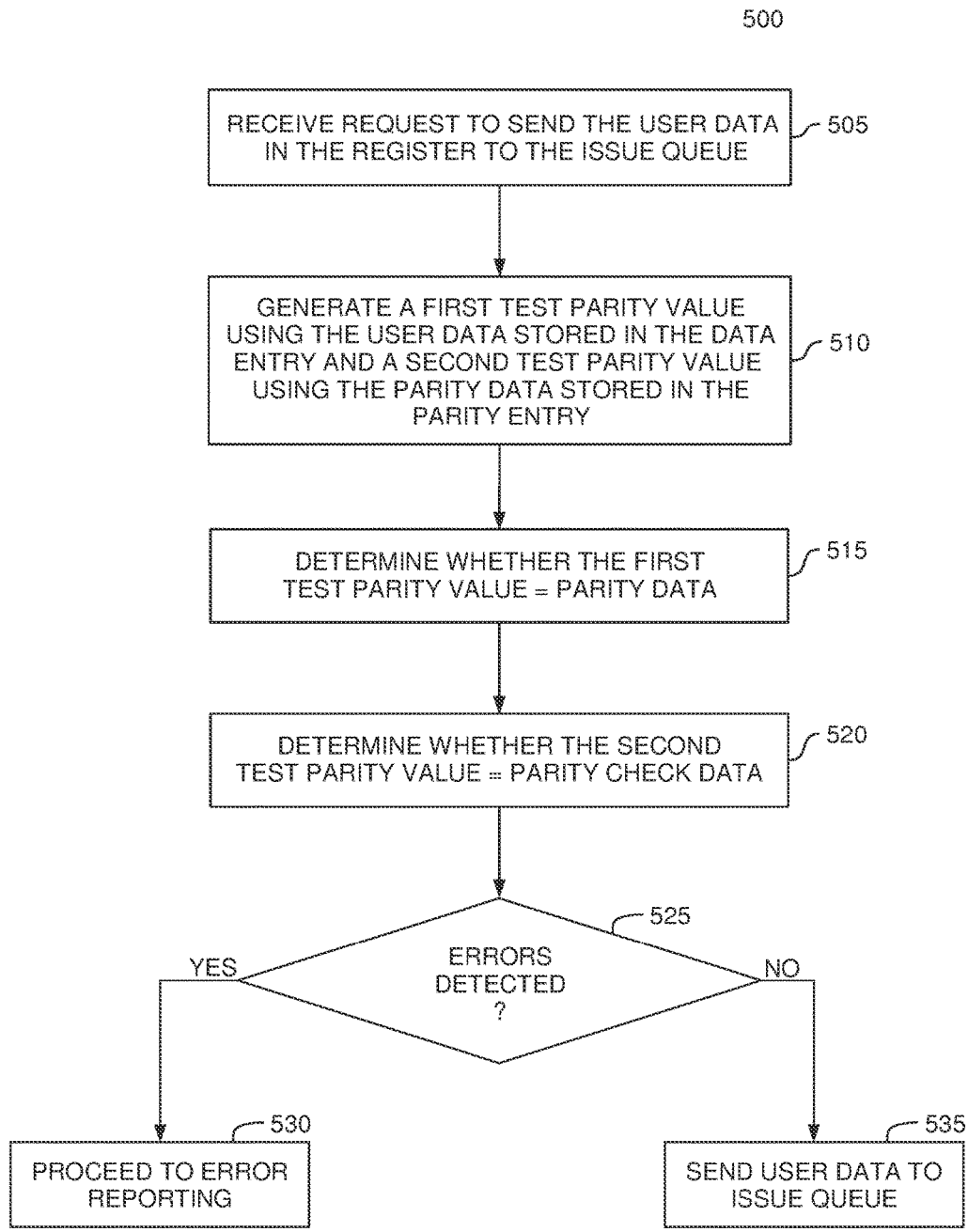
FIG. 5 is a flowchart for checking the validity of parity data using parity check data, according to one embodiment described herein.

FIG. 5 is a flowchart illustrating a method 500 for checking the validity of parity data using parity check data, according to one embodiment described herein. At block 505, the register receives a request to send the user data in the register to the issue queue. At block 510, before transmitting the user data to the issue queue, the processor generates a first test parity value using the user data stored in the data entry of the register and a second test parity value using the parity data stored in the parity entry. For example, the processor may use the same parity calculation algorithm used to generate the parity data to calculate the first test parity value. If the user data was not corrupted while stored in the register, the first test parity value will match the parity data. Similarly, the processor may use the same parity calculation algorithm used to generate the parity check data to calculate the second test parity value. If the parity data was not corrupted while stored in the register, the second test parity value should match the parity check data stored in the hardened latch.

At block 515, the processor determines if the first test parity value matches the parity data. If not, this means there is at least one error in the user data, the parity data, or both. Regardless whether the first test parity value and the parity data matches, method 500 proceeds to block 520 where the processor determines if the second test parity value matches the parity check data. For example, detecting an error at block 515 does not tell the processor if the error is in the user data or the parity data, and thus, the method proceeds to block 520 to determine if the error is in the parity data or parity check data. However, because the parity check data is stored in a hardened latch which is less susceptible to soft errors than the register storing the parity data, the processor may assume the error is in the parity data.

At block 525, the processor determines if any errors were reported at blocks 515 and 520—i.e., whether the test parity values were the same as the parity data and parity check data. If there were errors, method 500 proceeds to block 530 where the processor performs error reporting which may include attempting to correct the error in the user and/or parity data. If, for example, an error was detected at block 515 but not at block 520, the processor may assume the error is in the user data. However, if an error was detected at both blocks 515 and 520, the processor may assume there is an error in the parity data (but this does not necessarily mean there is not an error in the user data as well). As one example of an error, the parity check data may be a logical one indicating that the parity data, when it was initially stored in the register, included an odd number of logical zeros. However, if the second test parity value generated at block 510 using the parity data currently stored in the register is a logical zero (indicating the parity data now has an even number of logical zeros), the second test parity value does not match the parity check data and the method 500 proceeds to block 530.

Performing both checks shown in block 515 and 520 before proceeding to block 530 may enable the processor to make a better decision on how to proceed or how to correct the error. Furthermore, if there is a match at block 515, the method 500 still performs the check at block 520 as shown since there is a small, but possible, chance that both the user data and the parity data were corrupted even though the first test parity value and the parity data still matched—i.e., a false positive from a double bit flip. In that case, performing block 520 would indicate that the parity data has been corrupted, and thus, the method should proceed to block 530. However, in another embodiment, the processor may proceed directly to block 530 if either check performed at blocks 515 and 520 indicate there is an error in the register. That is, instead of performing both checks before determining to perform error checking, the processor may, for example, proceed directly to block 530 if an error is detected at block 515.

If no errors were reported, at block 535, the processor forwards the user data to the issue queue. The user data can then be processed according to one or more processor instructions—e.g., an add or multiply instruction. Although not shown, once processed, the user data may be stored back into the register by a load/store unit or into another memory element—e.g., cache, system memory, disk drive, etc.

Figure 6:
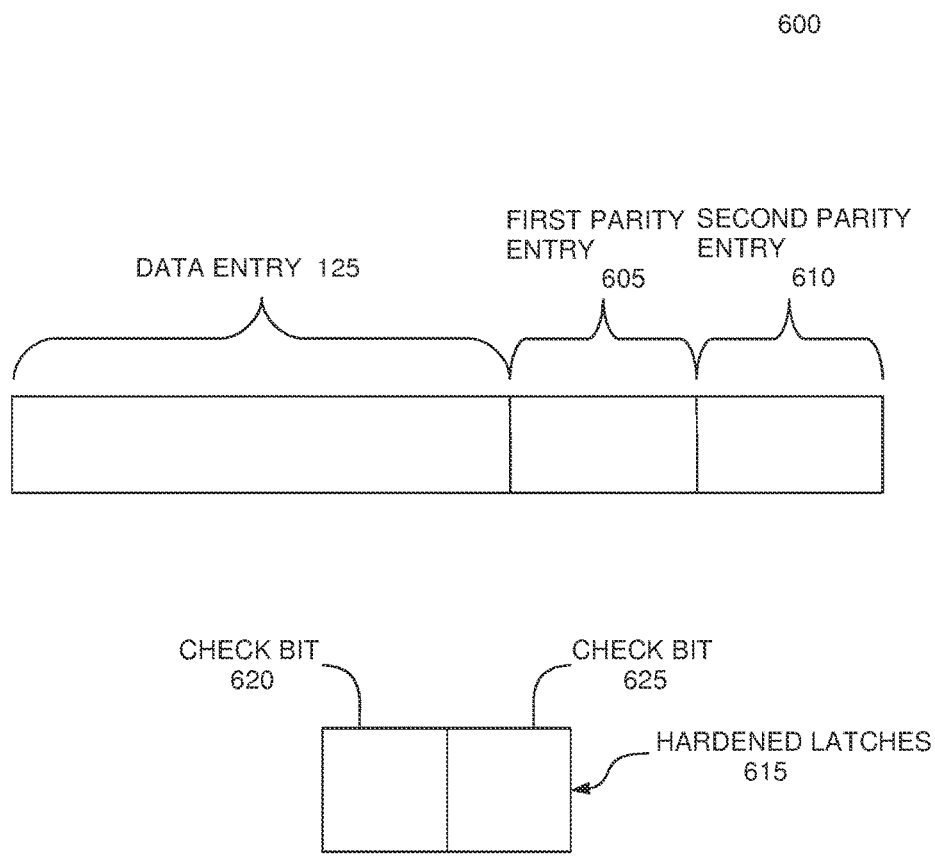
FIG. 6 illustrates storing parity check data corresponding to different parity values, according to one embodiment described herein.

FIG. 6 illustrates hardened latches 615 storing parity check data corresponding to different parity values, according to one embodiment described herein. In one embodiment, the computing system permits partial writes into a memory element—e.g., a register 600. For example, the data to be written into the register 600 may be spread across multiple sources. In one embodiment, the data is organized in blocks in memory, but the data to be written into the register 600 may span multiple blocks. In one embodiment, the computing system uses a byte-write mask (not shown) to track which parts of the register 600 store valid data and which do not. For example, if the first partial write includes data to be stored at bytes [5-7] of the data entry 125, the system updates the byte-write mask to indicate the last three bytes are valid while the first five bytes in the entry 125 are not. When the second partial write containing the remaining five bytes is received, the computing system can identify where these five bytes should be stored in the register 600 (i.e., in the first five byte locations [0-4]) by referencing the byte-write mask. The byte-write mask can be updated to indicate that all the data stored in the register 600 is valid. Moreover, if data is read out of the register 600 after the first partial write is complete but before the second partial write is performed, the byte-write mask informs the computing system which portions of the data in the register 600 is valid and which is not. Thus, by referencing the byte-write mask, the computing device can determine if the memory element stores only partial data or complete data.

Like above, the computing system may generate parity data for each of the partial writes. When storing the data of the first partial write, the computing system generates a first parity value for the data in the first partial write and stores this value in a first parity entry 605 in the register 600. Later, when performing the second partial write, the computing system generates a second parity value for the data in the second partial write and stores this value in a second parity entry 610 in the register 600. When retrieving the first and second parity values to perform error correction, the parity values can be combined to yield a combined parity value for the data in both the first and second partial writes.

Even if the computing system receives a request to read out the data in the register 600 before the second partial write has been performed, the first parity value can be used to ensure the data of the first partial write was not corrupted. For example, the computing system may use the byte-write mask to zero out the invalid bytes of the data stored in the data entry 125 and generate a test parity value using this combination of valid data and the additional zeros. The test parity value can be compared to the first parity value as described above to ensure an error was not introduced into the data. In this manner, by calculating and storing individual parity values for each partial write request, the computing system can perform error checking even when data from only one of the partial write requests has been loaded into the register 600.

Moreover, the computing system also generates separate parity check values for each of the partial writes. For example, the parity check bit 620 corresponds to the first parity value stored in entry 605, while the parity check bit 625 corresponds to the second parity value stored in entry 610. Thus, when reading out the data stored in register 600, the computing system can reference the parity check bits 620, 625 to ensure the parity values in entries 605, 610 were not corrupted. As described above, the parity check bits 620, 625 are stored in hardened latches 615, and thus, are less susceptible to soft errors than the data stored in the register 600.

For example, if the computing system has performed only the first partial write and thus some of the data bytes in the data entry 125 are invalid, when reading out the data, the computing system generates a test parity value for the parity data in the first parity entry 605 to ensure the data matches the parity check bit 620. If not, the computing system can perform the error reporting process indicated at block 520 of FIG. 5. Alternatively, if the computing system has performed both partial writes and all the data in the data entry 125 is valid, the system generates two test parity values (one for each of the parity values stored in entries 605, 610) which are then compared to the check bits 620, 625. If the test parity values match the check bits 620, 625, the computing system may proceed to combining the parity values in the entries 605, 610 in order to determine if the user data in the data entry 125 is valid as described above. If no errors are detected, the computing system may forward the user data to the issue queue for further processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An integrated circuit, comprising:
   a memory comprising a plurality of registers, each register comprising:
      a data entry, and
      a parity entry,
   a plurality of latches distinct from the plurality of registers;
   logic configured to:
      in response to receiving a write request to a first register of the plurality of registers, generate parity data based on data corresponding to the write request,
      store the data corresponding to the write request and the parity data in the first register,
      generate parity check data based on the parity data, wherein the parity check data, when compared with the parity data, indicates whether a soft error is introduced in the parity data when stored in the first register, and
      store the parity check data in a first latch of the plurality of latches.

2. The integrated circuit of claim 1, wherein each of the plurality of latches comprises a hardened latch that is less susceptible to soft errors than the plurality of registers.

3. The integrated circuit of claim 2, the logic configured to:
   in response to a read request corresponding to the first register:
      generate a first test parity value based on the parity data stored in the first register;
      compare the first test parity value to the parity check data stored in the first latch; and
      upon determining the first test parity value and the parity check data do not match, perform an error reporting process indicating there is an error in the parity data.

4. The integrated circuit of claim 3, the logic configured to:
   in response to the read request:
      generate a second test parity value based on the data corresponding to the write request that is stored in the first register;
      compare the second test parity value to the parity data stored in the first register; and
      upon determining the second test parity value and the parity data do not match, perform an error correction process to correct one of the data corresponding to the write request and the parity data.

5. The integrated circuit of claim 1, wherein each of the plurality of latches stores parity check data corresponding to parity data stored in a respective one of the plurality of registers.

6. The integrated circuit of claim 1, wherein the first latch has a predetermined bit size that is smaller than a predetermined bit size of the parity entry in the registers that store the parity data.

7. The integrated circuit of claim 1, wherein generating the parity check data comprises determining odd or even parity of the parity data stored in the first register.

8. A method comprising:
   in response to receiving a write request to a first register of a plurality of registers, generating parity data based on data corresponding to the write request,
   storing the data corresponding to the write request and the parity data in the first register,
   generating parity check data based on the parity data, wherein the parity check data, when compared with the parity data, indicates whether a soft error is introduced in the parity data when stored in the first register, and
   storing the parity check data in a first latch of a plurality of latches, wherein the plurality of latches are distinct from the plurality of registers.

9. The method of claim 8, wherein each of the plurality of latches comprises a hardened latch that is less susceptible to soft errors than the plurality of registers.

10. The method of claim 9, further comprising:
    in response to a read request corresponding to the first register:
       generating a first test parity value based on the parity data stored in the first register;
       compare the first test parity value to the parity check data stored in the first latch; and upon determining the first test parity value and the parity check data do not match, performing an error reporting process indicating there is an error in the parity data.

11. The method of claim 10, wherein
in response to the read request:
generating a second test parity value based on the data corresponding to the write request that is stored in the first register;
compare the second test parity value to the parity data stored in the first register; and
upon determining the second test parity value and the parity data do not match, perform an error correction process to correct one of the data corresponding to the write request and the parity data.

12. The method of claim 8, wherein each of the plurality of latches stores parity check data corresponding to parity data stored in a respective one of the plurality of registers.

13. The method of claim 8, wherein the first latch has a predetermined bit size that is smaller than a predetermined bit size of the parity entry in the registers that store the parity data.

14. The method of claim 8, wherein generating the parity check data comprises determining odd or even parity of the parity data stored in the first register.

15. A processor, comprising:
a memory comprising a plurality of registers, each register comprising:
a data entry, and
a parity entry,
a plurality of memory elements distinct from the plurality of registers, wherein the plurality of memory elements are less susceptible to soft errors than the plurality of registers;
logic configured to:
in response to receiving a write request to a first register of the plurality of registers, generate parity data based on data corresponding to the write request,
store the data corresponding to the write request and the parity data in the first register,
generate parity check data based on the parity data, wherein the parity check data, when compared with the parity data, indicates whether a soft error is introduced in the parity data when stored in the first register, and
store the parity check data in a first memory element of the plurality of memory elements.

16. The processor of claim 15, the logic configured to:
in response to a read request corresponding to the first register:
generate a first test parity value based on the parity data stored in the first register;
compare the first test parity value to the parity check data stored in the first memory element; and
upon determining the first test parity value and the parity check data do not match, perform an error reporting process indicating there is an error in the parity data.

17. The processor of claim 16, the logic configured to:
in response to the read request:
generate a second test parity value based on the data corresponding to the write request that is stored in the first register;
compare the second test parity value to the parity data stored in the first register; and
upon determining the second test parity value and the parity data do not match, perform an error correction process to correct one of the data corresponding to the write request and the parity data.

18. The processor of claim 15, wherein each of the plurality of memory elements stores parity check data corresponding to parity data stored in a respective one of the plurality of registers.

19. The processor of claim 15, wherein the first memory element has a predetermined bit size that is smaller than a predetermined bit size of the parity entry in the registers that store the parity data.

20. The processor of claim 15, wherein generating the parity check data comprises determining odd or even parity of the parity data stored in the first register.

* * * * *